US009737061B2

(12) United States Patent
Ikuta et al.

(10) Patent No.: US 9,737,061 B2
(45) Date of Patent: Aug. 22, 2017

(54) DUAL-BEARING REEL AND CLUTCH MECHANISM THEREOF

(71) Applicant: Shimano Inc., Sakai, Osaka (JP)

(72) Inventors: Takeshi Ikuta, Osaka (JP); Akira Niitsuma, Osaka (JP); Etsuyoshi Watarai, Osaka (JP); Kenji Yoshida, Osaka (JP)

(73) Assignee: Shimano Inc., Osaka (JP)

( * ) Notice: Subject to any disclaimer, the term of this patent is extended or adjusted under 35 U.S.C. 154(b) by 312 days.

(21) Appl. No.: 14/612,597

(22) Filed: Feb. 3, 2015

(65) Prior Publication Data
US 2015/0366179 A1    Dec. 24, 2015

(30) Foreign Application Priority Data

Jun. 19, 2014 (JP) ................................. 2014-126253

(51) Int. Cl.
| *A01K 89/01* | (2006.01) |
| *A01K 89/015* | (2006.01) |
| *A01K 89/00* | (2006.01) |

(52) U.S. Cl.
CPC .......... *A01K 89/015* (2013.01); *A01K 89/006* (2013.01); *A01K 89/0188* (2015.05); *A01K 89/01902* (2015.05)

(58) Field of Classification Search
USPC ................................................. 242/270, 271
See application file for complete search history.

(56) References Cited

U.S. PATENT DOCUMENTS

| 5,205,511 A | | 4/1993 | Morimoto | |
| 5,362,010 A | * | 11/1994 | Takamatsu | ........... A01K 89/015 242/261 |
| 5,746,381 A | * | 5/1998 | Miyazaki | ............. A01K 89/015 192/69.63 |
| 5,904,310 A | * | 5/1999 | Miyazaki | ............. A01K 89/015 192/107 R |
| 6,270,028 B1 | | 8/2001 | Kim et al. | |

(Continued)

FOREIGN PATENT DOCUMENTS

JP    2012-65574 A    4/2012

OTHER PUBLICATIONS

European Search Report of corresponding EP Application No. 15 17 0093.7 dated Nov. 24, 2015.

*Primary Examiner* — Emmanuel M Marcelo
(74) *Attorney, Agent, or Firm* — Global IP Counselors, LLP

(57) ABSTRACT

A clutch mechanism includes a clutch portion and a pinion gear. The pinion gear has an engaging part and a gear part. The engaging part is located on a first end as a spool-side end of the pinion gear and is capable of being engaged with the clutch portion. The gear part is meshed with the drive gear. The gear part has helical teeth enabling the pinion gear to be urged toward the spool by the drive gear. The engaging part has a bottom and a first wall. The first wall extends from the bottom toward the first end and tilts in the same direction as the helical teeth with respect to the spool shaft such that the pinion gear is urged oppositely to the spool by the clutch portion when the engaging part is engaged with the clutch portion and receives transmission of rotation in a fishing-line releasing direction from the spool.

15 Claims, 7 Drawing Sheets

(56) References Cited

U.S. PATENT DOCUMENTS

| | | | | |
|---|---|---|---|---|
| 7,007,881 B2* | 3/2006 | Chang | ............... | A01K 89/015 |
| | | | | 192/107 R |
| 2008/0173745 A1* | 7/2008 | Takechi | ............. | A01K 89/015 |
| | | | | 242/321 |
| 2012/0067993 A1* | 3/2012 | Nakagawa | ......... | A01K 89/015 |
| | | | | 242/257 |

* cited by examiner

DUAL-BEARING REEL AND CLUTCH MECHANISM THEREOF

CROSS-REFERENCE TO RELATED APPLICATIONS

This application claims priority to Japanese Patent Application No. 2014-126253, filed on Jun. 19, 2014, the entirety of which is hereby incorporated by reference in its entirety

BACKGROUND

Field of the Invention

The present invention relates to a dual-bearing reel and a clutch mechanism thereof configured to allow or prevent rotation, transmitted thereto from a handle through a drive gear, to be or from being transmitted to a spool rotatable about a spool shaft with respect to a reel unit.

Background Information

A dual-bearing reel includes a rotation transmission mechanism and a clutch mechanism. The rotation transmission mechanism is configured to enable rotation of a handle to be transmitted to a spool. On the other hand, the clutch mechanism is disposed on a transmission path of the rotation transmission mechanism. Further, the rotation transmission mechanism includes a drive gear and a pinion gear. The drive gear is mounted onto a drive shaft configured to be unitarily rotated with the handle. The pinion gear is meshed with the drive gear. The pinion gear is disposed so as to be axially movable and be rotatable about a spool shaft. On the other hand, the clutch mechanism includes a clutch pin and an engaging groove. The clutch pin is mounted to the spool shaft. The engaging groove is formed on the pinion gear. The pinion gear is movable between a clutch-on position and a clutch-off position. In the clutch-on position, the clutch pin is engaged with the engaging groove. The clutch-off position is located farther away from the spool than the clutch-on position is. In general, a dual-bearing reel employs helical gears as a drive gear and a pinion gear in order to enhance strength and increase a gear contact ratio (see Japan Laid-open Patent Application Publication No, JP-A-2012-65574). The direction of helical teeth of a well-known drive gear is set such that the drive gear urges the pinion gear toward the spool when being rotated in a fishing-line winding direction. The pinion gear is thus urged toward the spool in winding the fishing line, and the fishing line can be stably wound up even in application of high load.

In recent years, when the fishing line is subjected to significant tension by an abrupt pull of a fish or so forth, the fishing technique generally used is to perform thumbing of the fishing line while the clutch mechanism is turned off by operating a clutch operating member without operating a drag mechanism. In this fishing technique, releasing and winding of the fishing line can be quickly switched even when a large drag force has been preliminarily set. However, the fishing line is subjected to significant tension, the urging force by the aforementioned helical teeth is increased. This hinders a quick clutch-off operation in the well-known clutch mechanism.

SUMMARY

It is an object of the present invention to enable a quick clutch-off operation to be performed even when a clutch mechanism is subjected to a large load.

A clutch mechanism for a dual-bearing reel according to the present invention is capable of allowing or preventing rotation transmitted thereto from a handle through a drive gear to be or from being transmitted to a spool rotatable about a spool shaft with respect to a reel unit. The clutch mechanism includes a clutch portion and a pinion gear. The clutch portion is configured to be rotated in conjunction with the spool. The pinion gear has an engaging part and a gear part and is disposed so as to be rotatable about an axis of the spool shaft and be movable in a direction of the axis of the spool shaft. The engaging part is located on a first end as a spool-side end of the pinion gear and is capable of being engaged with and disengaged from the clutch portion. The gear part is located farther away from the spool than the engaging part, and is meshed with the drive gear. The gear part has helical teeth enabling the pinion gear to be urged toward the spool by the drive gear when the pinion gear receives the transmission of rotation of the handle in a fishing-line winding direction from the drive gear. The engaging part has a bottom and a first wall. The first wall extends from the bottom toward the first end and tilts in the same direction as the helical teeth with respect to the spool shaft such that the pinion gear is configured to be urged oppositely to the spool by the clutch portion when the engaging part is engaged with the clutch portion and receives transmission of rotation in a fishing-line releasing direction from the spool.

In the present clutch mechanism, when the handle is rotated in the fishing-line winding direction and rotation of the drive gear is transmitted to the spool through the pinion gear, the pinion gear is configured to be urged toward the spool by the drive gear. Contrarily, when rotational force is transmitted to the pinion gear from the spool, the clutch portion is engaged with the engaging part, more specifically, the first wall, and urges the pinion gear oppositely to the spool. Thus, the urging force applied toward the spool is reduced by the urging force applied oppositely to the spool, and a clutch-off operation can be quickly performed by a clutch operating member.

The first wall desirably tilts at an angle less than a helix angle of the helical teeth in a plan view. In this structure, the urging force applied toward the spool becomes greater than the urging force applied oppositely to the spool. Thus, the fishing line can be stably wound up even during application of high load.

The spool shaft may be coupled to the spool so as to be unitarily rotatable therewith. Further, the clutch portion may include a clutch pin to be disposed so as to penetrate the spool shaft along a diameter of the spool shaft. Yet further, the engaging part may have at least one engaging groove formed thereon along the diameter of the spool shaft. In this structure, the clutch mechanism is simply structured. Further, the clutch mechanism is durable against a larger load because the contact part between the clutch pin and the at least one engaging groove extends in the radial direction of the spool shaft.

The clutch mechanism may further include a clutch control part that is located between the engaging part and the gear part and has an outer diameter less than an outer diameter of the engaging part and an outer diameter of the gear part. In this structure, a clutch operation is enabled by the clutch operating member.

The pinion gear may be supported at the first end thereof and a second end thereof located on an opposite side of the first end by the reel unit so as to be rotatable and axially movable. In this structure, the pinion gear is supported at both ends thereof. Hence, the pinion gear is unlikely to tilt with respect to the spool shaft. This enables a clutch operation to be smoothly performed.

A dual-bearing reel according to another aspect of the present invention includes a reel unit, a spool that is rotatable with respect to the reel unit, and the aforementioned clutch mechanism. In this structure, the dual-bearing reel can be implemented so as to achieve the aforementioned advantageous effects.

Overall, according to the present invention, when a load is applied to the pinion gear from the spool, the clutch portion is engaged with the first wall and the pinion gear is urged oppositely to the spool. Thus, the urging force applied toward the spool is reduced by the urging force applied oppositely to the spool, and a clutch-off operation can be quickly performed by a clutch operating member.

BRIEF DESCRIPTION OF THE DRAWINGS

Referring now to the attached drawings which form a part of this original disclosure.

DETAILED DESCRIPTION OF EMBODIMENTS

Figure 1:
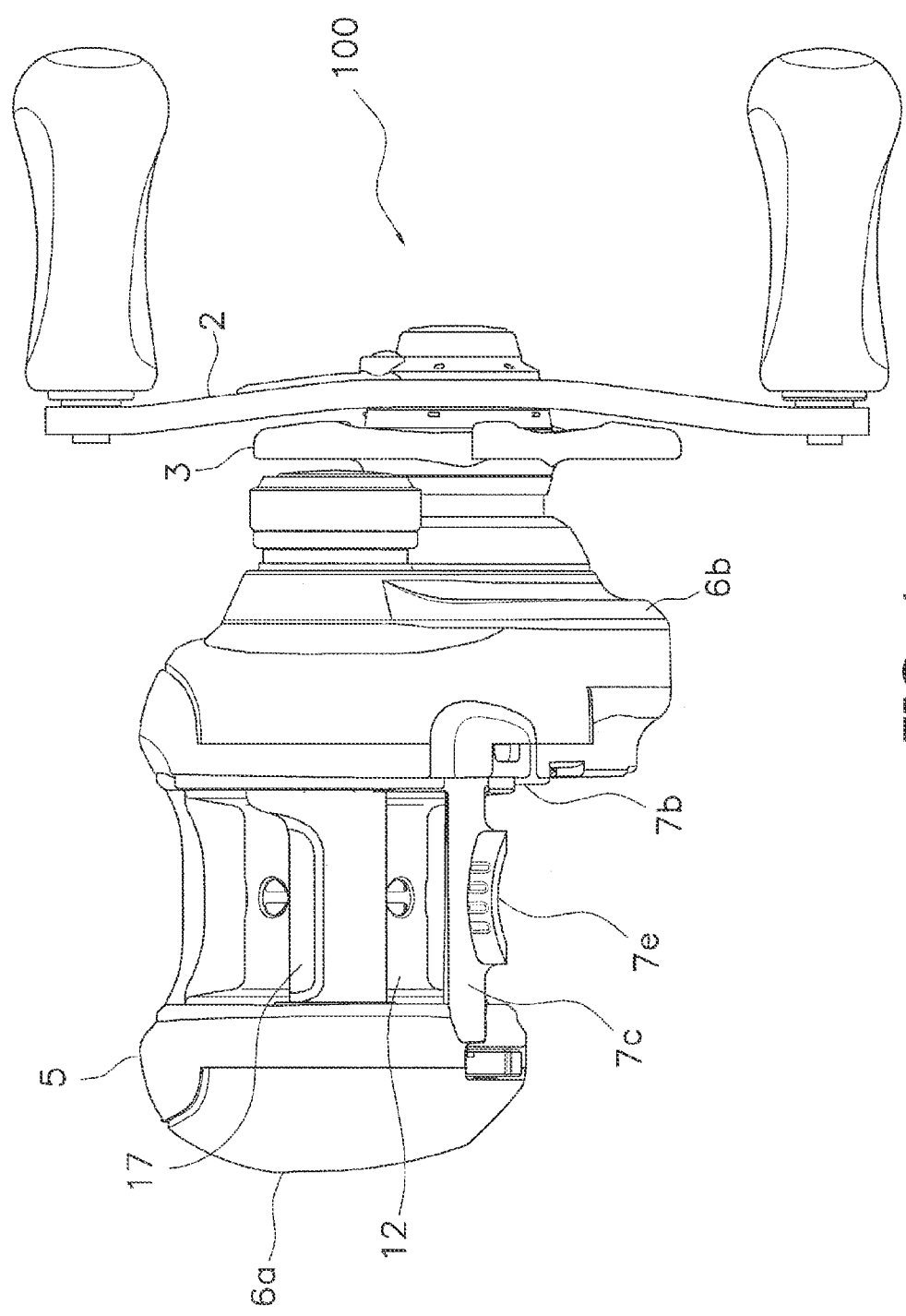
FIG. 1 is a rear view of a dual-bearing reel according to an exemplary embodiment of the present invention.
Figure 2:
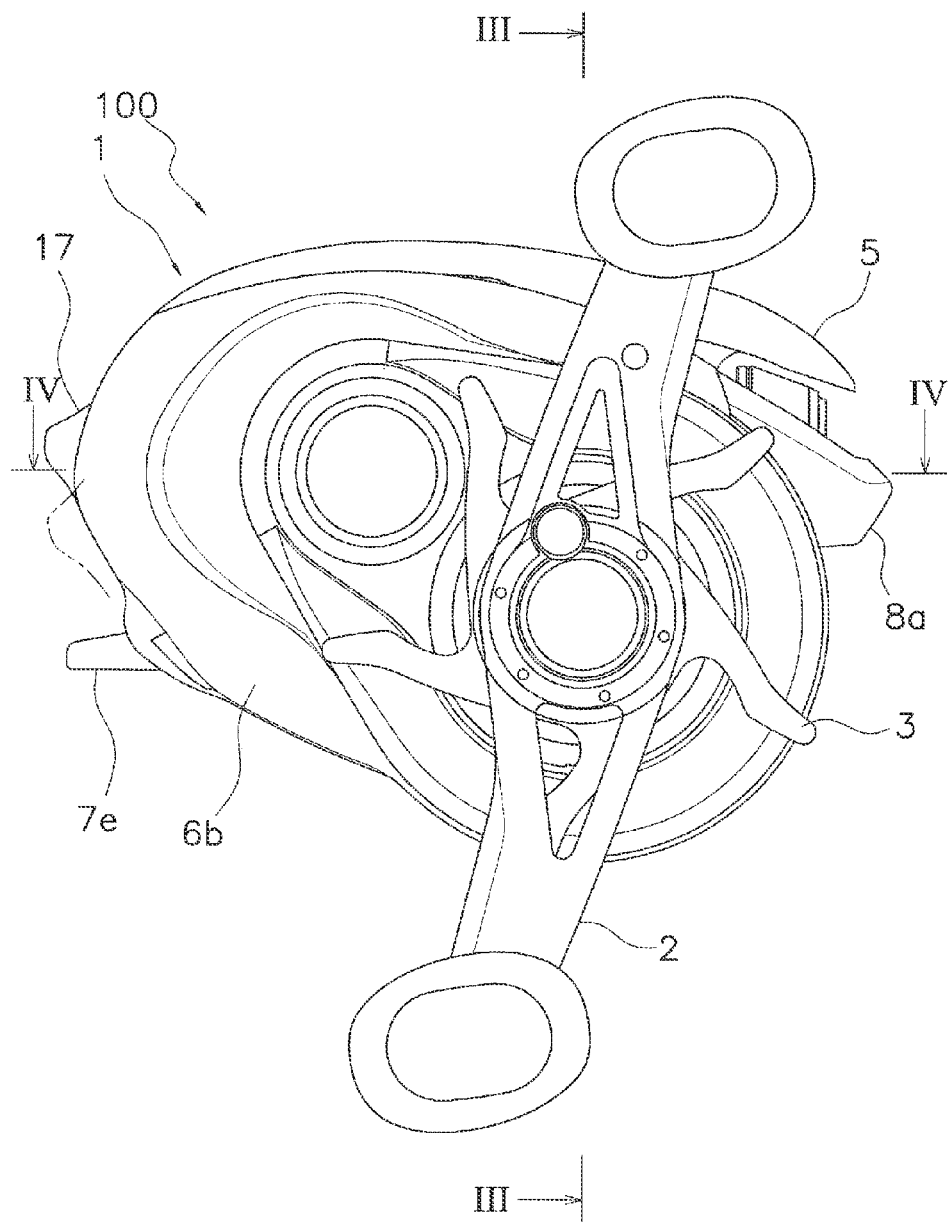
FIG. 2 is a side view of the dual-bearing reel seen from a handle side.

As illustrated in FIGS. 1 and 2, a dual-bearing reel 100 employing a first exemplary embodiment of the present invention is a compact low-profile reel for bait-casting. The dual-bearing reel 100 includes a reel unit 1, a handle 2 for spool rotation and a star drag 3 for drag regulation. The handle 2 is disposed laterally to the reel unit 1. The star drag 3 is disposed closer to the reel unit 1 than the handle 2 is. The dual-bearing reel 100 further includes a spool 12 for winding a fishing line, a spool shaft 16, a rotation transmission mechanism 18, a clutch mechanism 13 and a drag mechanism 21.

<Reel Unit>

As illustrated in FIGS. 1, 3, 4 and 5, the reel unit 1 includes a frame 5, a first side cover 6a and a second side cover 6b. The first and second side covers 6a and 6b cover both lateral sides of the frame 5. The reel unit 1 further includes a front cover 8a and a shaft strut portion 8b. The front cover 8a covers the front side of the frame 5. The shaft strut portion 8b is fixed to the first side cover 6a by screws or so forth.

The frame 5 includes a first side plate 7a, a second side plate 7b and a plurality of coupling parts 7c. The first side plate 7a is disposed on the opposite side of the handle 2. The second side plate 7b is disposed on the same side as the handle 2, while being opposed to the first side plate 7a. The coupling parts 7c couple the first side plate 7a and the second side plate 7b. The first side plate 7a has an opening 7d bored for enabling the spool 12 to pass therethrough. The shaft strut portion 8b is detachably coupled to the opening 7d. The upper side one of the coupling parts 7c is used as a thumb rest. The lower side one of the coupling parts 7c is integrally formed with a fishing-rod attachment part 7e.

Figure 5:
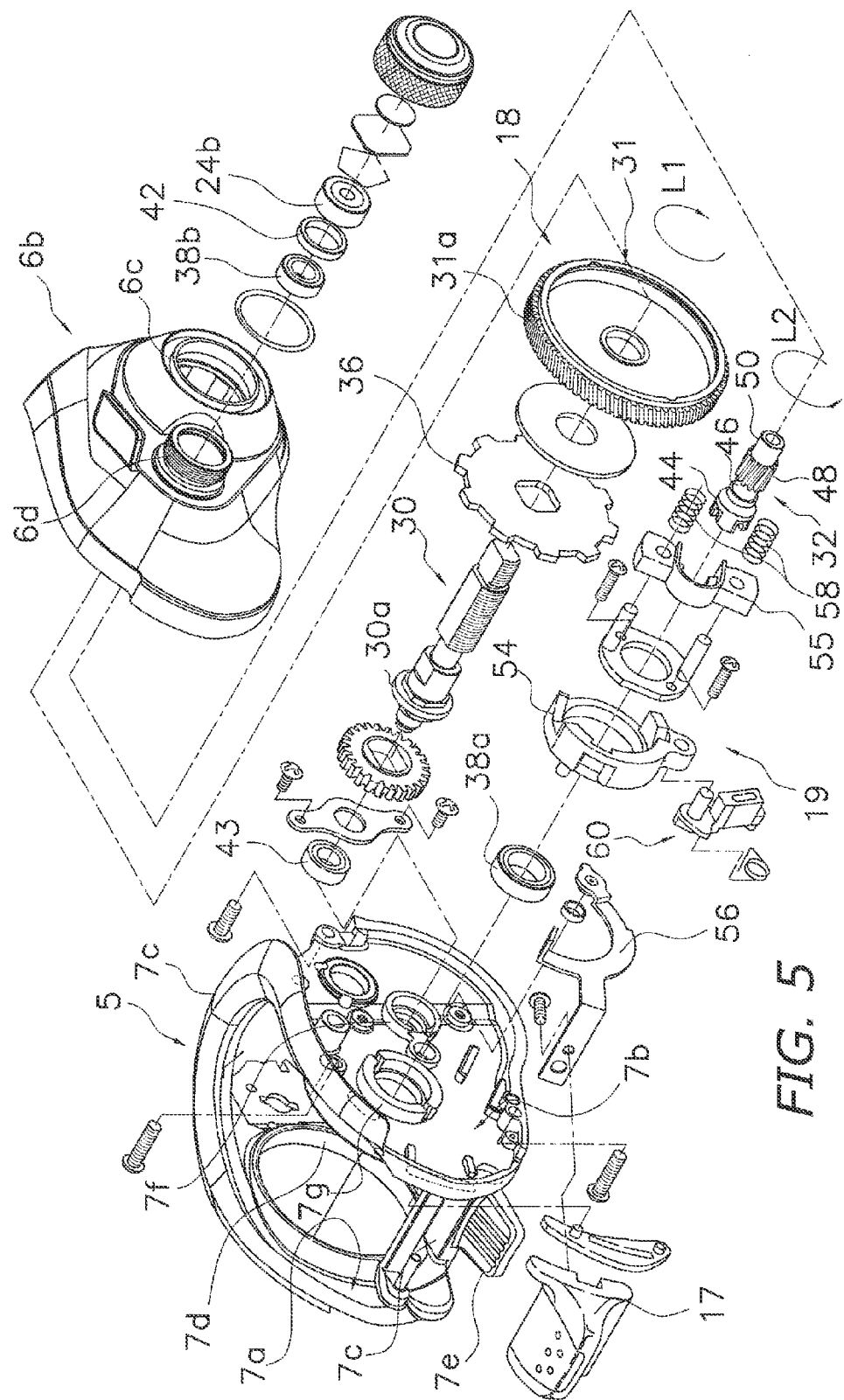
FIG. 5 is an exploded perspective view including a rotation transmission mechanism and a clutch mechanism.

The spool 12 for winding the fishing line is rotatably and detachably mounted between the first and second side plates 7a and 7b of the reel unit 1. As illustrated in FIG. 5, the second side plate 7b has a first boss 7f and a second boss 7g. Each of the first and second bosses 7f and 7g has a through hole. The first boss 7f supports the base end of a drive shaft 30 (to be described), onto which the handle 2 is coupled, such that the drive shaft 30 is rotatable. The second boss 7g supports a pinion gear 32 such that the pinion gear 32 is rotatable and axially movable.

Figure 4:
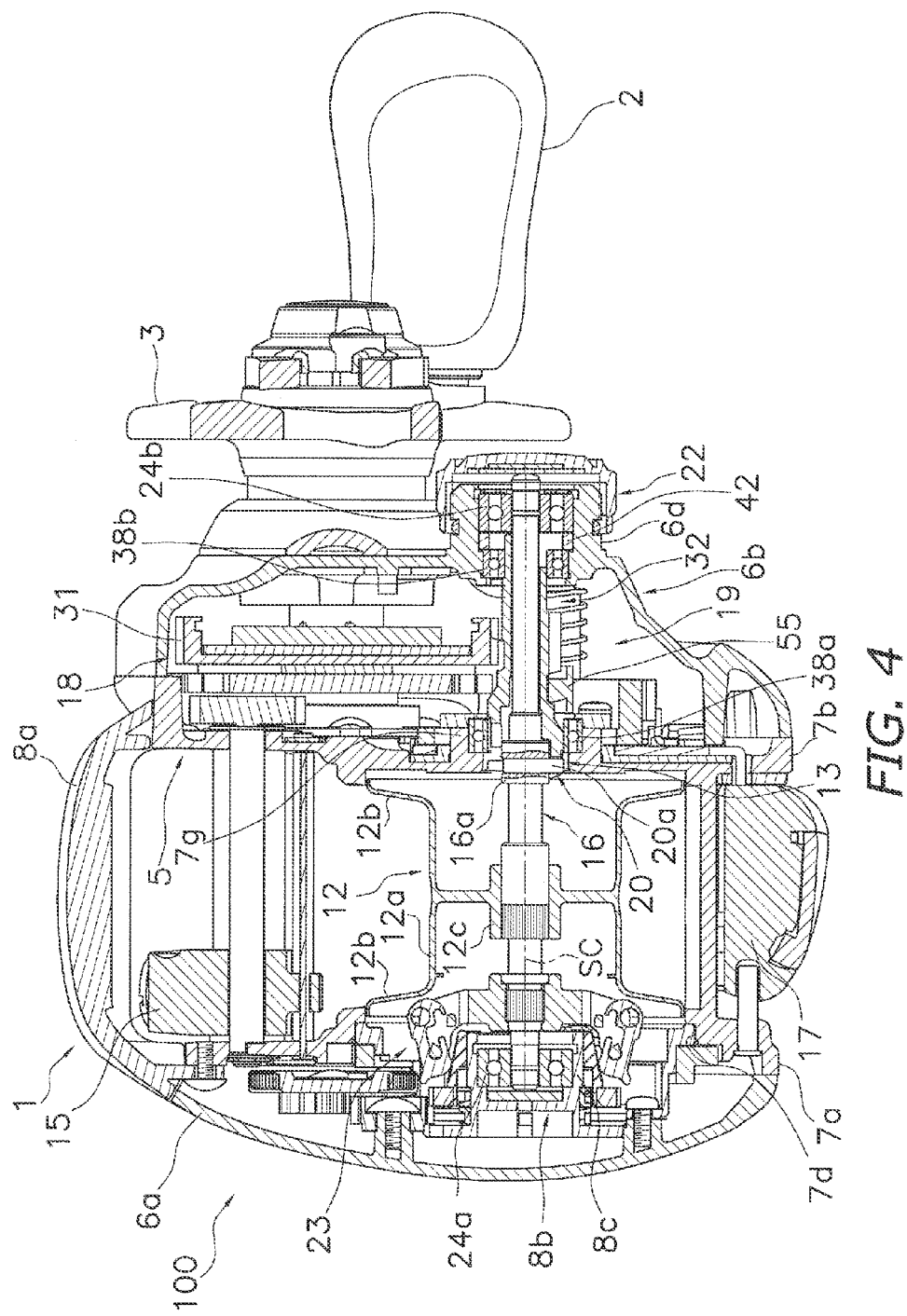
FIG. 4 is a cross-sectional view of FIG. 2 taken along a cutaway line IV-IV.

As illustrated in FIG. 4, the first side cover 6a is detachably coupled to the first side plate 7a through the shaft strut portion 8b. As illustrated in FIG. 5, the second side cover 6b has a third boss 6c and a fourth boss 6d. The third boss 6c supports the drive shaft 30 in a rotatable state. The fourth boss 6d supports the pinion gear 32 and the spool shaft 16 onto which the spool 12 is fixed.

As illustrated in FIG. 4, the shaft strut portion 8b is a closed-end tubular member. The shaft strut portion 8b has a tubular bearing accommodating part 8c in the inner peripheral part thereof. The bearing accommodating part 8c accommodates a bearing 24a in the interior thereof. The bearing 24a supports one end of the spool shaft 16.

Figure 3:
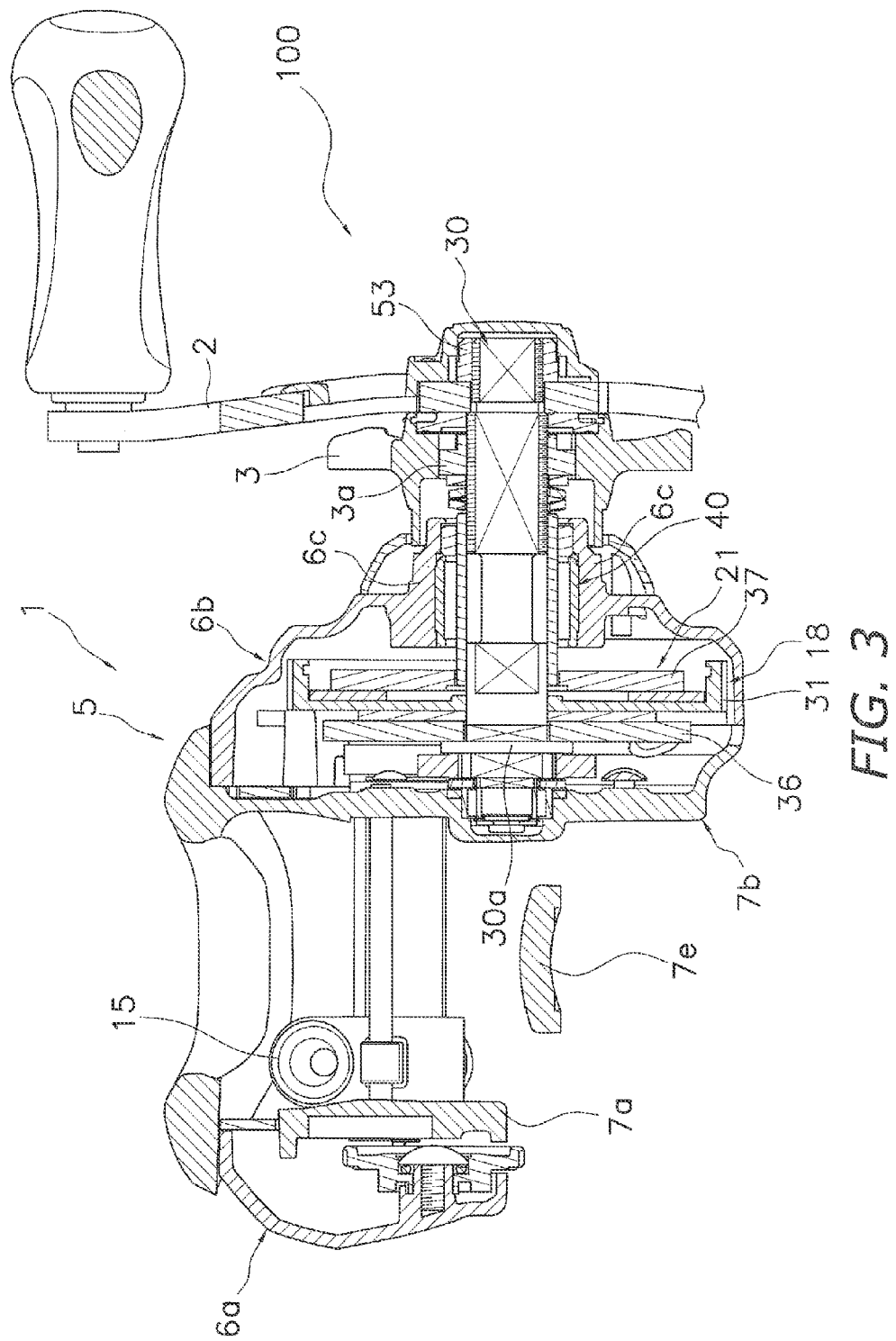
FIG. 3 is a cross-sectional view of FIG. 2 taken along a cutaway line III-III.

As illustrated in FIGS. 3 and 4, the spool 12, a level wind mechanism 15 and a clutch operating member 17 are disposed between the first side plate 7a and the second side plate 7b. The level wind mechanism 15 is configured to evenly wind the fishing line about the spool 12. The clutch operating member 17 serves as a thumb rest in thumbing the fishing line. The clutch operating member 17 performs an operation of switching the clutch mechanism 13 between a clutch-on state and a clutch-off state by pivoting about the spool shaft 16. The clutch operating member 17 is configured to pivot between a clutch-on position and a clutch-off position. In FIG. 2, the clutch-on position is depicted with a solid line, whereas the clutch-off position is depicted with a dashed two-dotted line.

The rotation transmission mechanism 18, the clutch mechanism 13, a clutch control mechanism 19, the drag mechanism 21 and a casting control mechanism 22 are disposed between the second side plate 7b and the second side cover 6b. The rotation transmission mechanism 18 is a mechanism configured to transmit the rotation of the handle 2 to the spool 12. The clutch control mechanism 19 is a mechanism configured to control the clutch mechanism 13 in response to the operation of the clutch operating member 17. As illustrated in FIG. 5, the clutch control mechanism 19 has a heretofore known structure composed of a clutch yoke 55, a clutch cam 54, a clutch plate 56 and a clutch returning mechanism 60. The casting control mechanism 22 is a brake mechanism configured to regulate resistive force to be applied during the rotation of the spool 12. Further, a spool brake device 23 is disposed between the first side plate 7a and the first side cover 6a. The spool brake device 23 is a device configured to brake the spool 12 by centrifugal force. The spool brake device 23 is a device configured to inhibit the occurrence of backlash in casting.

<Spool and Spool Shaft>

As illustrated in FIG. 4, the spool 12 has a bobbin trunk 12a, a pair of right and left flanges 12b and a boss 12c. The bobbin trunk 12a is a tubular part that the fishing line is wound onto the outer periphery thereof. The flanges 12b are integrally formed on the both axial ends of the bobbin trunk 12a, while respectively protruding radially outwardly. The boss 12c is fixed onto the spool shaft 16 by an arbitrary fixation method such as press-fitting. Thus, the spool 12 is coupled to the spool shaft 16 so as to be unitarily rotatable therewith.

The spool shaft 16 extends outward of the second side cover 6b, while penetrating through the second side plate 7b. One end of the spool shaft 16 is rotatably supported by the bearing 24a accommodated in the bearing accommodating part 8c of the shaft strut portion 8b. On the other hand, the other end of the spool shaft 16 is rotatably supported by a bearing 24b within the fourth boss 6d disposed on the second side cover 6b. Thus, the spool shaft 16 is supported by the reel unit 1 through the bearings disposed in two positions.

The spool shaft 16 penetrates through the second boss 7g of the second side plate 7b. A clutch portion 20, composing a part of the clutch mechanism 13, is fixed to the part of the spool shaft 16 that penetrates through the second boss 7g. The clutch portion 20 has a clutch pin 20a penetrating through the spool shaft 16. The clutch pin 20a penetrates through the spool shaft 16 along the radial direction of the spool shaft 16, while both ends thereof protrude from the spool shaft 16 in the radial direction. A pin penetrating part 16a, i.e., the part of the spool shaft 16 that the clutch pin 20a penetrates therethrough, has a large diameter similarly to a part of the spool shaft 16 onto which the spool 12 is fixed.

<Clutch Mechanism>

The clutch mechanism 13 is composed of the pinion gear 32 to be described and the clutch portion 20 including the clutch pin 20a. The clutch mechanism 13 is configured to allow or prevent rotation, transmitted thereto from the handle 2 through a drive gear 31, to be or from being transmitted to the spool 12. The clutch-on state refers to a state that the rotation from the handle 2 is allowed to be transmitted to the spool 12. On the other hand, the clutch-off state refers to a state that the rotation from the handle 2 is prevented from being transmitted to the spool 12. In the clutch-off state, the spool 12 becomes freely rotatable and the fishing line can be reeled out.

<Rotation Transmission Mechanism>

As illustrated in FIGS. 3, 4 and 5, the rotation transmission mechanism 18 includes the drive shaft 30, the drive gear 31 and the pinion gear 32. The drive shaft 30 is a member that the handle 2 is coupled to in a unitarily rotatable state. The drive gear 31 is mounted to the drive shaft 30. The pinion gear 32 is meshed with the drive gear 31.

The drive shaft 30 is made of metal such as stainless alloy or brass alloy. As illustrated in FIGS. 3 and 5, the drive shaft 30 has a brimmed part 30a with a large diameter. The drive shaft 30 is rotatably supported by the reel unit 1 through a bearing 43 and a one-way clutch 40. The bearing 43 is mounted to the first boss 7f of the second side plate 7b. The one-way clutch 40 is mounted to the third boss 6c of the second side cover 6b. The drive shaft 30 is enabled to be rotated only in a fishing-line winding direction by the one-way clutch 40 of a roller type. A ratchet wheel 36 is mounted onto the drive shaft 30 so as to be unitarily rotatable therewith. The ratchet wheel 36 serves as a drag receiver member for receiving the drag force of the drag mechanism 21. The ratchet wheel 36 is disposed between the drive gear 31 and the brimmed part 30a. The ratchet wheel 36 functions not only as the drag receiver member but also as the clutch returning mechanism 60 configured to return the clutch mechanism 13 from the clutch-off state to the clutch-on state. Further, the ratchet wheel 36 also functions as a pawl-type one-way clutch disposed in alignment with the one-way clutch 40.

As illustrated in FIG. 3, the drive gear 31 is rotatably mounted to the drive shaft 30. A drag plate 37 of the drag mechanism 21 is also mounted to the drive shaft 30 so as to be unitarily rotatable therewith. Further, a drag nut 3a of the star drag 3 is screwed onto the drive shaft 30. Yet further, the handle 2 is mounted to the tip end of the drive shaft 30 so as to be unitarily rotatable therewith. A nut 53 is also screwed onto the tip end of the drive shaft 30 in order to fix the handle 2 to the drive shaft 30.

Figure 7:
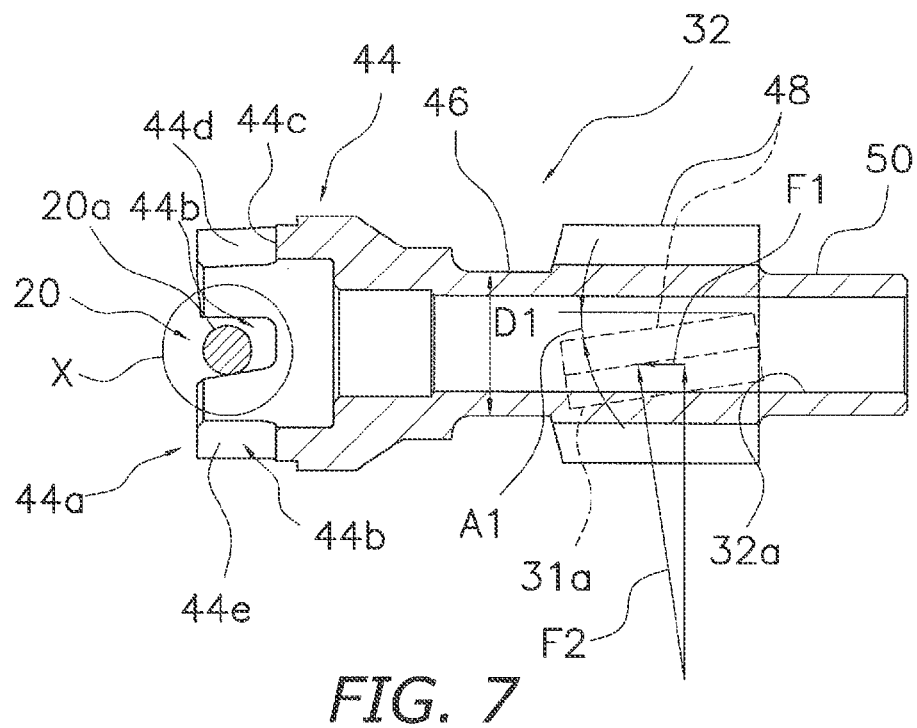
FIG. 7 is a cross-sectional view of FIG. 6 taken along a plane on which a cutaway line VII-VII is arranged.
Figure 8:
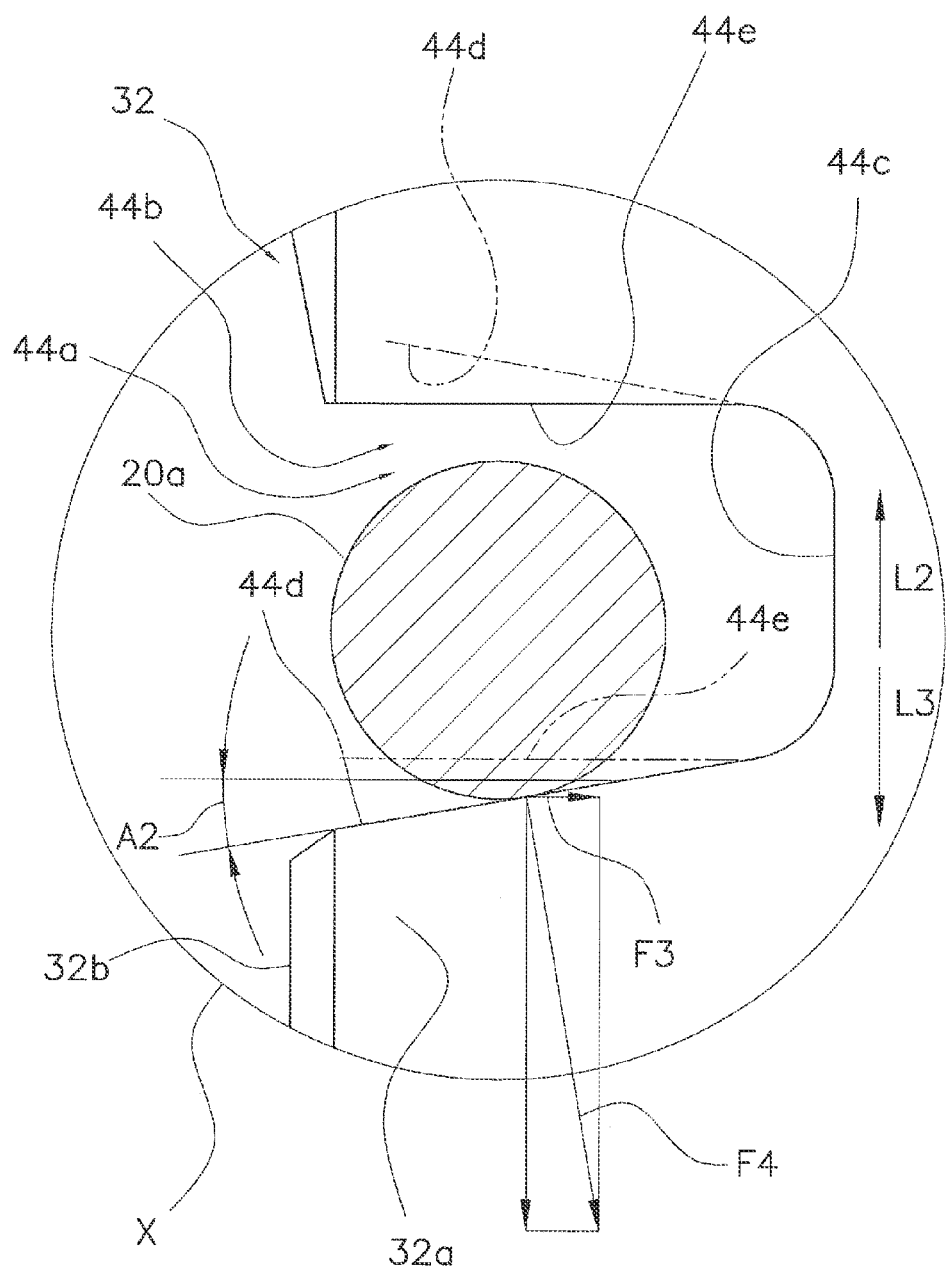
FIG. 8 is an enlarged view of a region X in FIG. 7.

Rotation of the drive shaft 30 is configured to be transmitted to the drive gear 31 through the drag mechanism 21. The drive gear 31 is a member made of metal such as stainless alloy or brass alloy As illustrated in FIG. 5, the drive gear 31 has a tooth part 31a on the outer peripheral part thereof The tooth part 31a is made in the form of helical teeth. The tooth part 31a is disposed so as to tilt with respect to the rotational axis of the drive gear 31 such that the drive gear 31 urges the pinion gear 32 toward the spool 12 when being rotated in the fishing-line winding direction (direction L1). The helix angle of the tooth part 31a is set to be, for instance, 20 degrees or less. In the present exemplary embodiment, the helix angle of the tooth part 31a of the drive gear 31 is set to be, for instance, 18 degrees (see FIG. 7). It should be noted that the fishing-line winding direction of the drive gear 31 is the clockwise direction in FIG. 2, i.e., the direction L1 in FIG. 5. On the other hand, the fishing-line winding directional rotation of the pinion gear 32 meshed with the drive gear 31 is the counterclockwise direction in FIG. 2, i.e., direction L2 in FIG. 5. The helix angle (see angle A1 in FIG. 7) of the pinion gear 32 is equal to, but in the opposite direction to, that of the drive gear 31. For example, the helix angle A1 is set to be 20 degrees or less. In the present exemplary embodiment, the helix angle A1 is set to be 18 degrees. As illustrated in FIG. 7, an urging force F1, applied from the drive gear 31 for urging the pinion gear 32 toward the spool 12, is a spool-shaft directional component of a force F2. The force F2 is vertically applied to a tooth surface of a gear part 48 (to he described) of the pinion gear 32 from a tooth surface of the tooth part 31a of the drive gear 31. It should be noted that each of FIGS. 7 and 8 is a cross-sectional view of the pinion gear 32 and illustrates the shape of the pinion gear 32 on the far side of the drawing surf ace in the depth direction.

Figure 6:
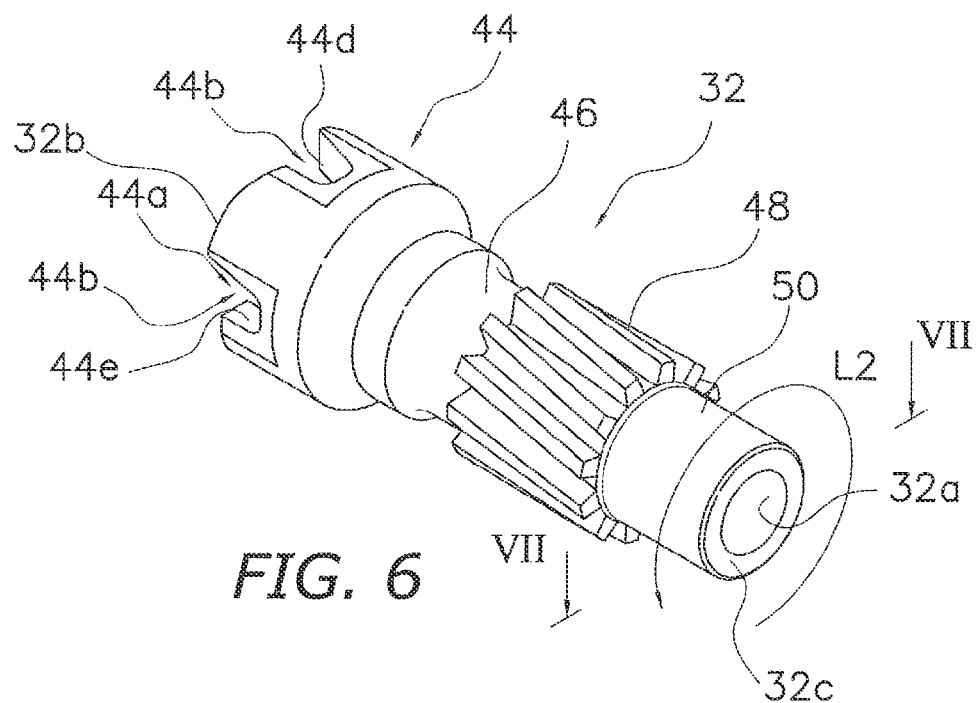
FIG. 6 is a perspective view of a pinion gear.

As illustrated in FIGS. 5, 6 and 7, the pinion gear 32 is a member made of metal such as stainless alloy or brass alloy The pinion gear 32 is a tubular member having a through hole 32a. The through hole 32a is a stepped through hole that enables the spool shaft 16 to penetrate through the center thereof The pinion gear 32 is supported by the reel unit 1 through bearings 38a and 38b so as to be rotatable and movable in the spool shaft direction. The pinion gear 32 is configured to be axially moved between the clutch-on position and the clutch-off position by the clutch control mechanism 19. The clutch-on position is a position close to the spool 12, whereas the clutch-off position is a position farther away from the spool 12 than the clutch-on position is. In FIG. 4, the clutch-on position is depicted on the upper side of a spool axis SC, whereas the clutch-off position is depicted on the lower side of the spool axis SC.

The pinion gear 32 has a first support part 44, a narrowed part 46, the gear part 48 and a second support part 50. The first support part 44, the narrowed part 46, the gear part 48 and the second support part 50 are disposed in alignment from a first end 32b to a second end 32c. The first end 32b is one end of the pinion gear 32 and is located on the same side as the spool 4. The second end 32c is the other end of the pinion gear 32 and is located oppositely to the first end 32b. The narrowed part 46 is an exemplary clutch control part. In the pinion gear 32, the first support part 44 is supported by the second boss 7g of the second side plate 7b through the bearing 38a so as to be rotatable and axially movable, whereas the second support part 50 is supported by the fourth boss 6d of the second side cover 6b through the bearing 38b so as to be rotatable and axially movable. Thus, the pinion gear 32 is supported at both ends thereof by the reel unit 1. Hence, the pinion gear 32 is unlikely to tilt, and does not make contact with the spool shaft 16. Consequently, the rotational speed of the spool 12 is unlikely to decelerate in free rotation.

The first support part 44 has an engaging part 44a on the end surface of the first end 32b disposed on the same side as the spool 4. The engaging part 44a is capable of being engaged with and disengaged from the clutch pin 20a. The engaging part 44a has a plurality of engaging grooves 44b formed along the radial direction of the spool shaft 16. For example, in the present exemplary embodiment, two engaging grooves 44b are formed along the radial direction and intersect at an angle of 90 degrees. As illustrated in FIG. 8, each engaging groove 44b is formed on the end surface of the first end 32b along the radial direction. As illustrated in an enlarged view of FIG. 8, each engaging groove 44b has a bottom 44c, a first wall 44d and a second wall 44e. The bottom 44c is recessed from the first end 32b and is disposed along the rotational direction of the pinion gear 32. The first wall 44d is one wall of the engaging groove 44b, which is disposed upstream in the fishing-line winding direction L2 of the pinion gear 32. The first wall 44d extends from the bottom 44c to the first end 32b so as to tilt with respect to the spool shaft 16 in the same direction as the helical-tooth shaped gear part 48 of the pinion gear 32. The second wall 44e is the other wall of the engaging groove 44b, which is disposed downstream in the fishing-line winding direction L2 of the pinion gear 32 so as to be disposed in opposition to the first wall 44d. The second wall 44e is disposed in parallel to the spool shaft 16.

The first wall 44d is formed such that the pinion gear 32 is urged in a direction opposite to the spool 12 (in a clutch-off direction) by the clutch pin 20a when being engaged with the clutch pin 20a and receives transmission of rotation of the spool 12 in a fishing-line releasing direction L3. Specifically in a plan view, the first wall 44d has a shape tilting with respect to the spool shaft 16 in the same direction as the helical-tooth shaped gear part 48 of the pinion gear 32. In the plan view, a slope angle A2 of the first wall 44d is less than the helix angle A1 of the helical tooth of the gear part 48 (see FIG. 7). In the present exemplary embodiment, the slope angle A2 is set to be, for instance, 16 degrees. The first wall 44d has a shape tilting so as to be gradually away from the second wall 44e in the direction from the bottom 44c to the first end 32b. It should be noted that in each engaging groove 44b, the positions of the first and second walls 44d and 44e are defined based on the rotational direction of the pinion gear 32. Hence, in each engaging groove 44b, the first and second walls 44d and 44e disposed on one end (depicted with a solid line in FIG. 8) and those disposed on the other end (depicted with a dashed two-dotted line in FIG. 8) are located in opposite positions in a plan view An urging force F3, applied from the clutch pin 20a for urging the pinion gear 32 oppositely to the spool 12, is a spool-shaft directional component of a three F4 vertically applied to the first wall 44d from the clutch pin 20a.

As illustrated in FIGS. 5, 6 and 7, the narrowed part 46 is disposed between the first support part 44 and the gear part 48. The outer diameter (D1) of the narrowed part 46 is less than that of the first support part 44.

The gear part 48 is disposed farther away from the spool 12 than the engaging part 44a is. The gear part 48 is composed of helical teeth capable of being meshed with the tooth part 31a of the drive gear 31. The helix angle A1 (e.g., 18 degrees) of the gear part 48 (see FIG. 7) is greater than the slope angle A2 (e.g., 16 degrees) of the first wall 44d of the engaging groove 44b (see FIG. 8). Thus, when the drive gear 31 is rotated in the fishing-line winding direction L1 and the pinion gear 32 is rotated in the fishing-line winding direction L2 as illustrated in FIG. 5, the urging force F1 applied toward the spool 12 becomes greater than the urging force F3 applied oppositely to the spool 12 even if a large load is applied to the fishing line from a caught prey. Therefore, a user of the dual-bearing reel 100 can stably wind up the fishing line even in application of high load.

The clutch yoke 55, composing a part of the clutch control mechanism 19, is engaged with the narrowed part 46. The clutch yoke 55 is configured to be located in an off-position (not illustrated in the drawings) when the clutch operating member 17 is set in the clutch-off position depicted with the dashed two-dotted line in FIG. 2. Contrarily, the clutch yoke 55 is configured to be moved to an on-position (depicted on the lower side of the spool axis SC in FIG. 4) together with the pinion gear 32 when the clutch operating member 17 is set in the clutch-on position depicted with the solid line in FIG. 2. It should be noted that the on-position is located closer to the spool 12 than the off-position is. Thus, the clutch pin 20a is engaged with one of the engaging grooves 44b, and the clutch mechanism 13 is set in the clutch-on state. It should be noted that the clutch yoke 55 is urged to the on-position by a pair of coil springs 58 (see FIG. 5).

Thus, the pinion gear 32 composes a part of the rotation transmission mechanism 18. The pinion gear 32 is herein configured to be rotated in conjunction with the handle 2 for transmitting the rotation of the handle 2 to the spool 12. Further, the pinion gear 32 also composes a part of the clutch mechanism 13. The pinion gear 32 is herein configured to be reciprocated in the direction of the spool shaft 16 in response to the operation of the clutch operating member 17.

The second support part 50 is disposed on the other end of the pinion gear 32. Specifically, the second support part 50 is supported by the fourth boss 6d of the second side cover 6b through the bearing 38b so as to be rotatable and axially movable. The bearing 38b is disposed together with the bearing 24b supporting the spool shaft 16 within the fourth boss 6d, while a spacer 42 is interposed therebetween.

<Action of Dual-Bearing Reel in Fishing>

When starting fishing with the dual-bearing reel 100 structured as described above, a user makes the spool 12 freely rotatable by operating and setting the clutch operating member 17 in the clutch-off position, and casts the fishing rod with the hand holding the dual-bearing reel 100. When a terminal tackle (e.g., a lure) lands in the water, the user rotates the handle 2 in the fishing-line winding direction. The clutch returning mechanism 60 herein returns the clutch mechanism 13 to the clutch-on state from the clutch-off state, and the fishing line is wound about the spool 12. The user waits for a prey to get caught in the terminal tackle while or without winding the fishing line. When the fishing line is wound about the spool 12, the clutch pin 20a presses the first wall 44d and thereby the pinion gear 32 is urged oppositely to the spool 12 (in the clutch-off direction) with the urging force F3. However, the urging force F1, applied by the drive gear 31 for urging the pinion gear 32 in the direction of the spool 12 (in a clutch-on direction), is greater than the urging force F3 applied by the clutch pin 20a. Therefore, the user can stably wind up the fishing line even in application of high load.

The user is required to reel out the fishing line when large tension acts on the fishing line due to an abrupt pull of fish, getting stuck of the terminal tackle with an object on the bottom of water, and so forth. The user herein operates and sets the clutch operating member 17 in the clutch-off position. When the fishing line is subjected to significant tension, as described above, the clutch pin 20a presses the first wall 44d and produces the urging force F3 for urging the pinion gear 32 oppositely to the spool 12. Thus, the urging force applied toward the spool 12 is reduced by the urging force F3. Hence, the user can quickly perform a clutch-off operation of the clutch operating member 17.

<Features>

The aforementioned exemplary embodiment can be expressed as follows.

(A) The clutch mechanism 13 for the dual-bearing reel 100 is a mechanism capable of allowing or preventing rotation transmitted thereto from the handle 2 through the drive gear 31 to be or from being transmitted to the spool 12 rotatable about the spool shaft 16 with respect to the reel unit 1. The clutch mechanism 13 includes the clutch portion 20 and the pinion gear 32. The clutch portion 20 is configured to be rotated in conjunction with the spool 12. The pinion gear 32 has the engaging part 44a and the gear part 48, and is disposed so as to be rotatable about the axis of the spool shaft 16 and be movable in the direction of the axis of the spool shaft 16. The engaging part 44a is located on the first end 32b as the spool-12-side end of the pinion gear 32 and is capable of being engaged with and disengaged from the clutch portion 20. The gear part 48 is located farther away from the spool 12 than the engaging part 44a is, and is meshed with the drive gear 31. The gear part 48 has helical teeth enabling the pinion gear 32 to be urged toward the spool 12 by the drive gear 31 when the pinion gear 32 receives transmission of rotation of the handle 2 in the fishing-line winding direction from the drive gear 31. The engaging part 44a has the bottom 44c and the first wall 44d. The first wall 44d extends from the bottom 44c toward the first end 32b and tilts in the same direction as the helical teeth with respect to the spool shaft 16 such that the pinion gear 32 is configured to be urged oppositely to the spool 12 by the clutch portion 20 when the engaging part 44a is engaged with the clutch portion 20 and receives transmission of rotation in the fishing-line releasing direction from the spool 12.

In the clutch mechanism 13, when the handle 2 is rotated in the fishing-line winding direction and the rotation of the drive gear 31 is transmitted to the spool 12 through the pinion gear 32, the pinion gear 32 is configured to be urged toward the spool 12 by the drive gear 31. Contrarily, when load is applied to the pinion gear 32 from the spool 12, the clutch portion 20 is engaged with the first wall 44d, and urges the pinion gear 32 oppositely to the spool 12. Thus, the urging force applied toward the spool 12 is reduced by the urging force applied oppositely to the spool 12, and a clutch-off operation can be quickly performed by the clutch operating member 17.

(B) The first wall 44d desirably tilts with respect to the spool shaft 16 at an angle less than the helix angle A1 of the helical teeth of the gear part 48 in a plan view. In the structure, the urging force F1 applied toward the spool 12 becomes greater than the urging force F3 applied oppositely to the spool 12. Thus, the fishing line can be stably wound up even in application of high load.

(C) The spool shaft 16 may be coupled to the spool 12 so as to be unitarily rotatable therewith. Further, the clutch portion 20 may include the clutch pin 20a to be disposed so as to penetrate the spool shaft 16 along the diameter of the spool shaft 16. Yet further, the engaging part 44a may have at least one engaging groove 44b formed thereon along the diameter of the spool shaft 16. In the structure, the clutch mechanism 13 is simply structured. Further, the clutch mechanism 13 is durable against larger load because the contact part between the clutch pin 20a and the at least one engaging groove 44b extends in the radial direction of the spool shaft.

(D) The clutch mechanism 13 may further include the narrowed part 46 that is located between the engaging part 44a and the gear part 48 and has an outer diameter less than that of the engaging part 44a and that of the gear part 48. In the structure, a clutch operation is enabled by the clutch operating member 17.

(E) The pinion gear 32 may he supported at the first end 32b and the second end 32c located on the opposite side of the first end 32b by the reel unit 1 so as to be rotatable and axially movable. In the structure, a clutch operation can be smoothly performed.

(F) The dual-bearing reel 100 includes the reel unit 1, the spool 12 that is rotatable with respect to the reel unit 1, and the aforementioned clutch mechanism 13. In the structure, the dual-bearing reel 100 can be implemented so as to achieve the aforementioned advantageous effects.

<Other Exemplary Embodiments>

One exemplary embodiment of the present invention has been explained above. However, the present invention is not limited to the aforementioned exemplary embodiment, and a variety of changes can be made without departing from the scope of the present invention. Especially, a plurality of exemplary embodiments and modifications described in the present specification can be arbitrarily combined on an as-needed basis.

(a) In the aforementioned exemplary embodiment, the pinion gear 32 is supported by the reel unit 1 through two bearings so as to be rotatable and axially movable. However, the present invention is not limited to the structure. The present invention is also applicable to a structure that the pinion gear is supported by the reel unit through only a single bearing so as to be rotatable and axially movable.

(b) In the aforementioned exemplary embodiment, the outer diameter of the narrowed part 46 is greater than that of the second support part 50. Contrarily, the outer diameter of the narrowed part 46 may be less than that of the second support part 50.

(c) In the aforementioned exemplary embodiment, the drive gear 31 is rotatably mounted to the drive shaft 30. However, the present invention is also applicable to a type of dual-bearing reel that the drive gear is mounted to the drive shaft so as to be unitarily rotatable therewith.

(d) In the aforementioned exemplary embodiment, the clutch portion 20 includes the clutch pin 20a mounted to the spool shaft 16. However, the present invention is not limited to the structure. For example, the clutch portion may be composed of a plurality of protruding parts that protrude from a part of the spool shaft, which is located close to the pinion gear, so as to be capable of engaging with the engaging part of the pinion gear. In the structure, the protruding parts may protrude in the radial direction, or alternatively, may protrude in the spool shaft direction.

(e) In the aforementioned exemplary embodiment, the present invention has been explained by exemplifying a low-profile dual-bearing reel. However, the present inven-

What is claimed is:

1. A clutch mechanism for a dual-bearing reel, being capable of allowing or preventing rotation transmitted thereto from a handle through a drive gear to be or from being transmitted to a spool rotatable about a spool shaft with respect to a reel unit, the clutch mechanism comprising:
   a clutch portion configured to be rotated in conjunction with the spool; and
   a pinion gear having an engaging part and a gear part, and being disposed so as to be rotatable about an axis of the spool shaft and be movable in a direction of the axis of the spool shaft, the engaging part being disposed on a first end, as a spool-side end, of the pinion gear and being configured to engage with and disengage from the clutch portion, the gear part being configured so as to be disposed farther away from the spool than the engaging part is disposed, and being configured to mesh with the drive gear,
   the gear part having helical teeth enabling the pinion gear to be urged toward the spool by the drive gear when the pinion gear receives transmission of rotation of the handle in a fishing-line winding direction from the drive gear, and
   the engaging part having a bottom and a first wall, the first wall extending from the bottom toward the first end and tilting in the same direction as the helical teeth with respect to the spool shaft such that the pinion gear is configured to be urged oppositely to the spool by the clutch portion when the first wall of the engaging part is engaged with the clutch portion and receives transmission of rotation in a fishing-line releasing direction from the spool.

2. The clutch mechanism for a dual-bearing reel according to claim 1, wherein
   the spool shaft is coupled to the spool so as to be unitarily rotatable therewith,
   the clutch portion includes a clutch pin to be disposed so as to penetrate the spool shaft along a diameter of the spool shaft, and
   the engaging part has at least one engaging groove formed thereon along the diameter of the spool shaft.

3. The clutch mechanism for a dual-bearing reel according to claim 2, further comprising
   a clutch control part located between the engaging part and the gear part and having an outer diameter less than an outer diameter of the engaging part and an outer diameter of the gear part.

4. The clutch mechanism for a dual-bearing reel according to claim 2, wherein
   the pinion gear is supported at the first end thereof and a second end thereof located on an opposite side of the first end by the reel unit so as to be rotatable and axially movable.

5. A dual-bearing reel, comprising:
   a reel unit;
   a spool being rotatable with respect to the reel unit; and
   the clutch mechanism for the dual-bearing reel recited in claim 2.

6. The clutch mechanism for a dual-bearing reel according to claim 1, further comprising
   a clutch control part located between the engaging part and the gear part and having an outer diameter less than an outer diameter of the engaging part and an outer diameter of the gear part.

7. A dual-bearing reel, comprising:
   a reel unit;
   a spool being rotatable with respect to the reel unit; and
   the clutch mechanism for the dual-bearing reel recited in claim 6.

8. The clutch mechanism for a dual-bearing reel according to claim 1, wherein
   the pinion gear is supported at the first end thereof and a second end thereof located on an opposite side of the first end by the reel unit so as to be rotatable and axially movable.

9. A dual-bearing reel, comprising:
   a reel unit;
   a spool being rotatable with respect to the reel unit; and
   the clutch mechanism for the dual-bearing reel recited in claim 8.

10. A dual-bearing reel, comprising:
    a reel unit;
    a spool being rotatable with respect to the reel unit; and
    the clutch mechanism for the dual-bearing reel recited in claim 1.

11. A clutch mechanism for a dual-bearing reel, being capable of allowing or preventing rotation transmitted thereto from a handle through a drive gear to be or from being transmitted to a spool rotatable about a spool shaft with respect to a reel unit, the clutch mechanism comprising:
    a clutch portion configured to be rotated in conjunction with the spool; and
    a pinion gear having an engaging part and a gear part, and being disposed so as to be rotatable about an axis of the spool shaft and be movable in a direction of the axis of the spool shaft, the engaging part being disposed on a first end, as a spool-side end of the pinion gear and being configured to engage with and disengage from the clutch portion, the gear part being configured so as to be disposed farther away from the spool than the engaging part is disposed, and being configured to mesh with the drive gear,
    the gear part having helical teeth enabling the pinion gear to be urged toward the spool by the drive gear when the pinion gear receives transmission of rotation of the handle in a fishing-line winding direction from the drive gear, and
    the engaging part having a bottom and a first wall, the first wall extending from the bottom toward the first end and tilting in the same direction as the helical teeth with respect to the spool shaft such that the pinion gear is configured to be urged oppositely to the spool by the clutch portion when the engaging part is engaged with the clutch portion and receives transmission of rotation in a fishing-line releasing direction from the spool,
    the first wall tilting at an angle less than a helix angle of the helical teeth in a plan view.

12. The clutch mechanism for a dual-bearing reel according to claim 11, wherein
    the spool shaft is coupled to the spool so as to be unitarily rotatable therewith,
    the clutch portion includes a clutch pin to be disposed so as to penetrate the spool shaft along a diameter of the spool shaft, and
    the engaging part has at least one engaging groove formed thereon along the diameter of the spool shaft.

13. The clutch mechanism for a dual-bearing reel according to claim 11, further comprising a clutch control part located between the engaging part and the gear part and having an outer diameter less than an outer diameter of the engaging part and an outer diameter of the gear part.

14. The clutch mechanism for a dual-bearing reel according to claim 11, wherein the pinion gear is supported at the first end thereof and a second end thereof located on an opposite side of the first end by the reel unit so as to be rotatable and axially movable.

15. A dual-bearing reel, comprising:

a reel unit;

a spool being rotatable with respect to the reel unit; and the clutch mechanism for the dual-bearing reel recited in claim 11.

* * * * *